(12) United States Patent
Cataldo et al.

(10) Patent No.: US 8,572,589 B2
(45) Date of Patent: Oct. 29, 2013

(54) PROGRAMMING LANGUAGE TRANSLATOR AND ENABLING TRANSLATION OF MACHINE-CENTRIC COMMANDS FOR CONTROLLING INSTRUMENT

(75) Inventors: James Adam Cataldo, Saratoga, CA (US); Long Bill Huynh, Daly City, CA (US); Stanley T. Jefferson, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 1156 days.

(21) Appl. No.: 12/495,300

(22) Filed: Jun. 30, 2009

(65) Prior Publication Data

US 2010/0333076 A1 Dec. 30, 2010

(51) Int. Cl.
*G06F 9/44* (2006.01)
(52) U.S. Cl.
USPC ............................ 717/140; 717/125; 717/141
(58) Field of Classification Search
USPC .................................. 717/136–143, 124–129
See application file for complete search history.

(56) References Cited

U.S. PATENT DOCUMENTS

| | | | | |
|---|---|---|---|---|
| 5,787,245 A * | 7/1998 | You et al. | 714/38.13 |
| 5,909,577 A * | 6/1999 | Devanbu | 717/127 |
| 6,158,045 A * | 12/2000 | You | 717/124 |
| 6,223,134 B1 * | 4/2001 | Rust et al. | 702/121 |
| 6,311,327 B1 * | 10/2001 | O'Brien et al. | 717/114 |
| 6,608,638 B1 * | 8/2003 | Kodosky et al. | 715/771 |
| 6,823,505 B1 * | 11/2004 | Dowling | 717/140 |
| 6,975,957 B2 * | 12/2005 | Tillotson et al. | 702/123 |
| 7,134,081 B2 * | 11/2006 | Fuller et al. | 715/735 |
| 7,565,647 B2 * | 7/2009 | Davidov et al. | 717/140 |
| 7,607,098 B2 * | 10/2009 | Grehlinger et al. | 715/762 |
| 7,721,272 B2 * | 5/2010 | Mockford | 717/140 |
| 7,761,858 B2 * | 7/2010 | Chang et al. | 717/140 |
| 7,788,645 B2 * | 8/2010 | Agarwala | 717/128 |
| 7,810,082 B2 * | 10/2010 | Levenshteyn | 717/141 |
| 7,836,433 B2 * | 11/2010 | Fanning et al. | 717/126 |
| 7,885,792 B2 * | 2/2011 | Devane | 703/2 |
| 7,984,429 B2 * | 7/2011 | Hunt | 717/130 |
| 8,079,027 B2 * | 12/2011 | Fong et al. | 717/170 |
| 8,127,280 B2 * | 2/2012 | Thomas et al. | 717/136 |
| 8,166,462 B2 * | 4/2012 | Kosche et al. | 717/130 |
| 8,356,282 B1 * | 1/2013 | Leippe et al. | 717/125 |
| 8,370,818 B2 * | 2/2013 | Osminer et al. | 717/140 |
| 8,429,627 B2 * | 4/2013 | Jedlicka et al. | 717/143 |
| 8,458,667 B2 * | 6/2013 | Hartadinata | 717/125 |
| 2005/0232302 A1 | 10/2005 | Tillotson et al. | |
| 2008/0161957 A1 | 7/2008 | Rice et al. | |

OTHER PUBLICATIONS

Nicoara et al, "Controlled, Systematic, and Efficient Code Replacement for Running Java Programs", ACM, pp. 233-246, 2008.*

(Continued)

*Primary Examiner* — Anil Khatri

(57) ABSTRACT

A computer readable medium stores a program, executable by a computer, for enabling translation of machine-centric commands in an instrument protocol to a programming language for controlling an instrument configured to use the machine-centric commands. The computer readable medium includes an identifying code segment for identifying instrument protocol commands executable by the instrument, and a generating code segment generates methods corresponding to the instrument protocol commands, each method including programming language source code or compiled machine code for executing the corresponding instrument protocol command. A storing code segment stores the methods in a program library associated with the instrument, the program library enabling selection of at least one method by a programming language program that controls the instrument, in order to execute the instrument protocol command corresponding to the selected method.

20 Claims, 5 Drawing Sheets

OTHER PUBLICATIONS

Johnson et al, "Speculative Thread Decomposition Through Empirical Optimization", ACM, pp. 205-214, 2007.*

Cattell et al, "Code Generation in a Machine-Independent Compiler", ACM SIGPLAN, pp. 1-13, 2003.*

Gong et al, "An Improved Automatic MPI Code Generation Algorithm for Distributed Memory Machine", IEEE, pp. 1-6, 2006.*

* cited by examiner

PROGRAMMING LANGUAGE TRANSLATOR AND ENABLING TRANSLATION OF MACHINE-CENTRIC COMMANDS FOR CONTROLLING INSTRUMENT

BACKGROUND

Test instruments and other electronic devices are controlled using command sets, which include program instructions specific to the instrument. Industry standards have been developed in order to promote efficiency among different types of instruments and different manufacturers. Also, standardization promotes computer control of instruments and systems of instruments interfaced within a control network.

One standard protocol is the Standard Commands for Programmable Instrumentation (SCPI) protocol, which defines a uniform set of commands for controlling programmable test and measurement instruments. A client application, e.g., operating on a remote computer system, may cause instruments with which it interfaces to execute various commands, such as measuring voltages, applying specific signals, performing calibration, and the like. SCPI Commands include "commands" and "queries". According to the SCPI protocol, a command is an instruction or program message sent to an instrument for controlling settings, measurements, timing and other aspects of the instrument, and a query is an instruction or program message sent to the instrument, to which the instrument responds with a result or response message. In the SCPI protocol, queries contain a "?" symbol and commands do not.

SCPI Commands consist of strings defining certain operations of the instrument, organized in a hierarchical structure referred to as "trees." For example, the MEASURE command is a parent node of a SCPI Command tree, which configures the instrument to read various types of data or child nodes, identified by the string. For example, the program message "MEASURE:VOLT:DC?" instructs the instrument to measure DC voltage of a received signal and to return the measurement result as a response message. The SCPI protocol also includes a command reference, which provides definitions for the program messages. The command reference definitions specify syntax and semantics of the SCPI program messages, for example.

Programming an instrument in machine-centric form is difficult. For example, in order to program an instrument using SCPI Commands, the user must adequately understand the SCPI protocol and be able convert data types into correctly formatted SCPI strings. For example, if the user wants to retrieve a waveform trace from an instrument using the SCPI protocol, the user must understand SCPI definite length block formatting in order to extract trace data from the response message from the instrument. The user also needs to understand the endianness of the data and the number of bits per data point in order to convert the trace data into an array of trace points that is understandable. The user has no way to know if the strings are formatted correctly until the program is run.

Conventional techniques to simplify programming of instruments introduce an additional interface layer, called a device driver, which attempts to translate a machine-centric interface into human-centric form, and otherwise hide the low-level programming details of sending SCPI Commands to control the instrument. An instrument driver provides a set of instrument control procedures available in an integrated development environment (IDE), such as Visual Studio® and Eclipse®. However, it may be difficult to program instruments using drivers because each driver is different, and may be incomplete and buggy. However, instrument drivers do save time over direct programming using SCPI Commands, since instrument drivers catch errors at compile time rather than run time.

SUMMARY

In a representative embodiment, a computer readable medium storing a program, executable by a computer, enables translation of machine-centric commands in an instrument protocol to a programming language for controlling an instrument configured to use the machine-centric commands. The computer readable medium includes an identifying code segment for identifying instrument protocol commands executable by the instrument, and a generating code segment for generating methods corresponding to the instrument protocol commands, each method including programming language source code or compiled machine code for executing the corresponding instrument protocol command. The computer readable medium also includes a storing code segment for storing the methods in a program library associated with the instrument, the program library enabling selection of at least one method by a programming language program that controls the instrument, in order to execute the instrument protocol command corresponding to the selected method.

In another representative embodiment, a system for enabling translation of Standard Commands for Programmable Instrumentation (SCPI) protocol commands and queries to a programming language for controlling an instrument configured to use SCPI commands and queries, includes a translation module and a program library module. The translation module is configured to receive computer readable descriptions of SCPI commands and queries identified with respect to the instrument, and to generate programming language routines for translating the SCPI commands and queries to be compatible with the programming language. The program library module is configured to store the programming language routines, where the programming language routines are accessible to a control program written in the programming language for controlling at least one operation of the instrument.

In another representative embodiment, a system for controlling an instrument using SCPI protocol commands and queries includes a program library and a processor. The program library is configured to store previously generated methods, each method being associated with execution of one SCPI protocol command or query associated with the instrument and written in a high-level programming language. The processor is configured to control operation of the instrument based on a control program written in the high-level programming language, the control program retrieving one of the previously generated methods from the program library and executing the retrieved method to perform one of a SCPI command or query associated with the retrieved method.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such apparatuses and methods are clearly within the scope of the present teachings.

In various embodiments, machine-centric commands, such as SCPI commands and queries (collectively referred to as SCPI Commands), of one or more electronic instruments are identified and described in computer readable descriptions. Using the descriptions, the commands are wrapped in a set of application program interfaces (APIs) in a high-level, human-centric programming language, such as C#, C++, Java®, Visual Basic®, Matlab®, Python®, Perl®, Tcl, Ruby, PHP, JavaScript®, ML, Haskell, Lisp, Scheme, Erlang, Smalltalk, Objective-C®, Fortran, Cobal, Pascal or the like. The APIs include methods or routines corresponding to the SCPI Commands, which are stored in a program library and provided to the user, in order to facilitate efficient and accurate programming of the instruments by the user using the programming language. The methods may be selectively called and executed by the user's computer system in order to control the corresponding instruments, without the user having to engage in the tedious process of direct programming using the machine-centric commands. The user of the instrument may therefore more easily construct an instrument control program, using the desired programming language, without having to address data type conversions and formatting required to program with SCPI.

Figure 1:
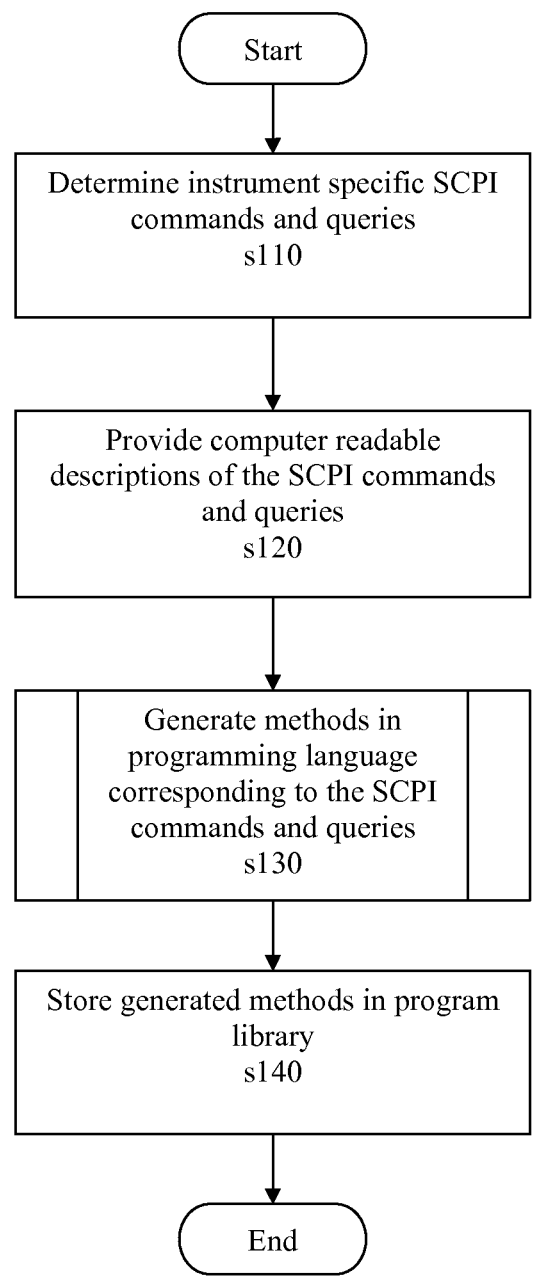
FIG. 1 is a flow diagram of a process for translating instrument control language to programming language, according to a representative embodiment.

FIG. 1 is a flow diagram of a programming language translation process, according to a representative embodiment, in which machine-centric commands are effectively translated into corresponding methods or routines in a higher level, human-centric programming language. Throughout the following description, SCPI is used as an example protocol for the machine-centric commands, for purposes of discussion. It is understood, however, that various embodiments may include other low level protocols for machine-centric commands without departing from the scope of the present teachings.

In block s110, the process determines the set of SCPI Commands specific to the instrument which is to be controlled. The instrument may be a test instrument, such as a digital multimeter (DMM), a voltmeter, a signal generator, or the like. In practice, various instruments have different sets of SCPI Commands, depending on various factors, such as functionality and manufacturer of each instrument. The SCPI Commands may be determined in a variety of ways. For example, a computer system configured to execute an algorithm for performing the programming language translation process (e.g., as discussed below with respect to FIG. 3) may retrieve the SCPI Commands (and/or associated descriptions) file from a storage medium, such as a disk, USB memory, database, or the like. In an embodiment, a database storing the SCPI Commands as a SCPI description file corresponding to the instrument may be accessible through a web server connected to the Internet or other packet switching data network, and so that the SCPI description file may be downloaded to the computer system. The previously stored SCPI Commands may be made available by the manufacture of the instrument, e.g., through a website. Alternatively, the computer system may be connected to the actual instrument through an appropriate interface to download the SCPI Commands.

Once the set of SCPI Commands has been identified, a computer readable description of SCPI Commands is produced at block s120. In an embodiment, the computer readable description of the SCPI Commands is an XML description file, for example. The description file may be created manually, automatically or a combination of both, where a user is prompted to enter descriptions based on the identified SCPI Commands. The description file of the SCPI Commands includes information enabling execution of all functions of the instrument. In an embodiment, the description file identifies all SCPI "commands" and "queries" used by the instrument, discussed above.

In an embodiment, the description file also includes a set of valid "syntaxes" for each command and query. A syntax includes a base command and a set of parameters corresponding to the base command. For a query, the syntax also includes a set of return values for each base command and parameters. An example of a base command in the SCPI protocol is ":VOLT," which may include parameters for setting and/or measuring voltage of the electronic instrument. For example, to set the voltage of the electronic instrument to 10V on channel 2, the appropriate command would be ":VOLT 10V, @2", where ":VOLT" is the base command and the voltage (10V) and channel number (2) are parameters. An example of a related query is ":VOLT? @2," which instructs the electronic instrument to measure the voltage on channel 2. The electronic instrument would return the measured value (e.g., 10V) in response. A syntax for a query may have multiple return values. In a four-channel device for instance, ":VOLT?" may return four different voltages, representing the voltages on each channel.

In an embodiment, the description file also includes formats for the parameters of each syntax. The format specifies the valid strings that can be given as values to the parameter. Sets of allowed parameter formats of the syntaxes are defined, for example, in the IEEE 488 standard, the contents of which are hereby incorporated by reference. The set of possible units for a parameter may also be specified in the description file, although units may not be included or relevant for some parameters. Similarly, for each return value in a query's syntax, the description file also includes the format of the response type. The format specifies the valid strings that can be returned as the result of a query. There are a set of allowed return value formats defined in the IEEE 488 standard, for example.

Block s130 depicts a process in which one or more APIs are generated for the syntaxes associated with the SCPI commands and queries. In an embodiment, each API is a collection of methods or routines in a desired programming language corresponding to the SCPI commands and queries, using various syntaxes and parameters. As described in detail with reference to FIG. 2, below, the generated methods enable translation of each SCPI command into a corresponding block of code in the programming language. In alternative embodiments, the methods can be generated as source code or compiled code. Source code can be easily inspected to understand how it works, while compiled code is more difficult to inspect, but requires less memory. In block s140, the methods are stored on a computer readable medium as a program library corresponding to the instrument. The program library is accessible to a user of the instrument, in order to program operations of the instrument using the programming language (without having to specify the actual SCPI Commands). In other words, a user program written in the programming language may call any methods of the program library in order to control the instrument in accordance with the called method.

Figure 2:
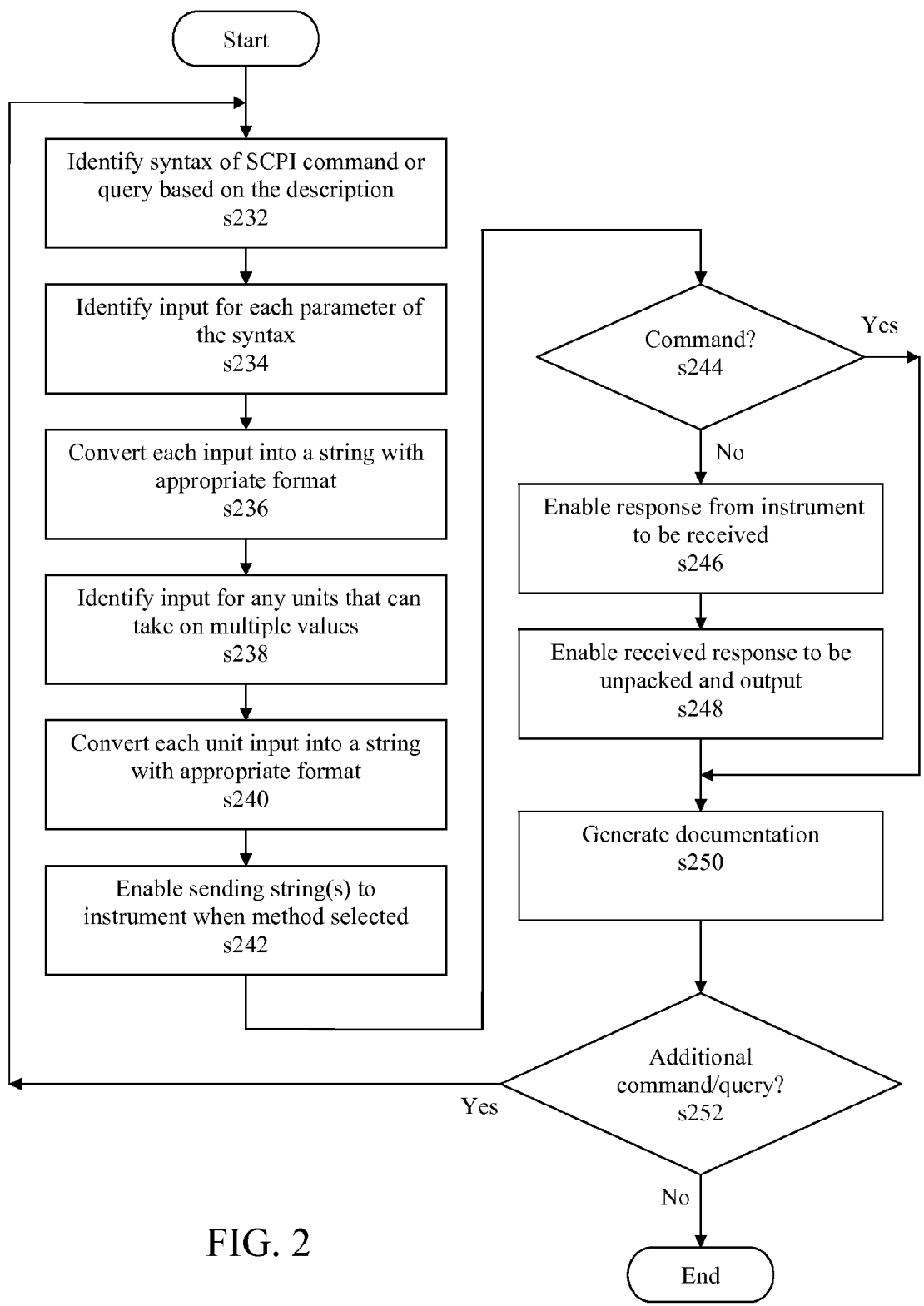
FIG. 2 is a flow diagram of a process for translating instrument control language to programming language, according to a representative embodiment.

FIG. 2 is a flow diagram of a programming language translation process, according to a representative embodiment, depicting the process depicted in block s130 of FIG. 1 in detail. The process of FIG. 2 uses the computer readable description file describing the SCPI commands and queries, discussed above with respect to block s120 of FIG. 1. For purposes of explanation, the process of FIG. 2 is described in the context of translating one SCPI command or query at a time to generate the corresponding method in the programming language, until all SCPI commands and queries of the instrument have been translated. However, it is understood that the depicted process is intended as one example, and that the various SCPI commands and queries may alternatively be translated simultaneously, in whole or in part, or in some other fashion, without departing from the scope of the present teachings.

In block s232 of FIG. 2, a syntax is identified of a SCPI command or query based on the description file. For each parameter of the syntax, an input is identified in block s234. The type of the input may be a native type in the programming language, such as "double" or "int", which corresponds to the SCPI format of the parameter. In block s236, each input is converted into a string having an appropriate format for the parameter of the command or query. For example, if the number 10 were a parameter input, it may be converted into the string as "10" or "1.0E2" (scientific notation).

Similarly, in block s238, an input is determined for any units of the syntax parameters that can take on multiple values. The method may enable the user to specify unit values, such as "V" or "mV", which may be specified as strings, for example. Some programming languages, such as C# or Java®, enable "enumerations" (sets of allowed values) to be specified. For these programming languages, a corresponding enumeration type, like VoltageUnits {V, mV, uV} may be defined. When a value from an enumeration is provided as a unit, the method converts the value to a string in step s240, such as the VoltageUnit.V value of the SCPI protocol to the string "V" defined by the programming language.

In block s242, the method includes instructions for sending the string(s) to the instrument in response to the method being selected, e.g., by a program executed by a computer system controlling the instrument. In an embodiment, the string would be sent to the instrument using a logical address for the instrument, such as a VISA address or an Ethernet address, for example. In an embodiment, the logical address is specified as a parameter in each generated method (not shown). Alternatively, a separate method may be generated to define the instrument address, so that the instrument address does not need to be given as an argument to every method in the generated code corresponding to every command and query, thus reducing the amount of code in each method. However, this may not be possible if the programming language for code generation is purely functional, such as Haskell, for example. Purely functional programming languages have no concept of state and thus cannot remember the value of the address. Therefore, when generating methods for controlling instruments using purely functional programming languages, the logical address must be specified as a parameter in each method, as discussed above.

In block s244, the process determines whether the method being generated is associated with a command or a query. When the method is associated with a command (block s244: Yes), the process proceeds to block s250, where documentation associated with the method and/or corresponding command is generated, e.g., when the documentation is available in the SCPI description file, discussed below. In an embodiment, the method may provide for "error" checking (not shown) before determining whether there are additional commands and/or queries. For example, the method may generate a query to be sent to the instrument to verify that the previous command caused no problems. If an error is detected, the program may exit with an error or throw an exception, depending on what is commonly done in the programming language in which the methods are written. An advantage of exception handling is that the detected error need not halt execution of the rest of the program.

When the method is not associated with a command (block s244: No), e.g., when the method is associated with a query, the process includes instructions enabling a response from the instrument to be received by the method in block s246. In an embodiment, the method may provide a "timeout" (not shown), indicating a predetermined period of time the process awaits the response during execution of the method. If no response is received after the predetermined period of time, the method may provide for an error condition, in which case the program may exit with an error or throw an exception, depending on the programming language in which the methods are written. As discussed above with respect to the instrument address, the timeout period may be specified as an argument to each method. Alternatively, the timeout period may be specified as a state that each method references, thus reducing the amount of information for each method.

In step s248, the method provides the capability to receive return value(s) from the instrument in response to the query and to output the received returned value(s), after they are unpacked. When the method allows for only one return value, for example, its type may be derived from the format of the return value. For instance, if the return value is formatted as a number, the result may be "double" in a programming language such as C#. When the method allows for multiple return values, the response depends on the programming language. When the programming language does not support multiple return values, the return values must be "bundled". When the programming language is Java®, for example, bundling may include entering all of the results into an array of type "object", which is the most general type in Java®. When the programming language supports multiple return values, each return value is given a type may be derived from the format of the return value, as with single return values.

The process then proceeds to block s250, where documentation associated with the method and/or query is generated, e.g., when that documentation is available in the SCPI description file. The documentation may be generated manually, automatically or a combination of both, by translating the documentation from the descriptions of the SCPI Commands, e.g., in the XML description file, to programming language documentation format. For both commands and queries, some programming languages include special documentation formats that can be used by programming tools, such as IDEs, to enable browsing and/or searching of the documentation. For example, Java® has "Javadoc" format, and C# has a special XML format. IDEs like Eclipse® and Visual Studio® use the documentation formats to provide visual assistance while a user is writing code in the programming language, for which the programming language translation process is available. IDEs also provide search capabilities to search the documentation, assisting in selection of the various methods that are available.

After documentation associated with the method has been generated, the process proceeds to block s252 to determine whether there are additional commands and/or queries identified in the description file that have not yet had corresponding methods generated. When there is at least one more additional command or query (block s252: Yes), the process returns to block s232 to generate a method corresponding to the additional command or query (e.g., blocks s232-s250). When there are no more commands or queries (block s252: No), the process ends. The methods are stored in a program library associated with the instrument, as discussed above with reference to block s140 in FIG. 1, and provided to a user for write a control program in the programming language to control the instrument.

An example of a method generated by the process depicted in FIG. 2 addresses reading a DC voltage from a digital multimeter (DMM), which involves the SCPI query "MEASURE:VOLTAGE:DC?" The code for executing this query may be in C# programming language, for example, and include the following:

```
// Create a TcpClient for the server instrument
// and associated with the necessary port number.
TcpClient client = new TCPClient ("130.27.64.166 5025);
// Translate the passed command into ASCII and store it as a Byte array,
Byte[ ] data = system.Text.Encoding.ASCII.GetBytes
("MEASURE:VOLTAGE:DC?\n");
// Get a client stream for reading and writing.
NetworkStream stream = client.GetStream ( );
// Send the command to the socket-enabled instrument.
stream.Write (data, 0, data.Length);
// Buffer to store the response bytes.
// For simplicity of this example, we allocate just for a 256-byte maximum
// response size.
Data = new Byte [256];
// String to store the response ASCII representation.
String responseData = String.Empty;
//Read the batch of response bytes.
Int32 bytes = stream.Read (datea, 0, data.Length);
responseData = System.Text.Encoding.ASCII.GetString (data, 0, bytes);
double DCVoltage = Double.Parse (resonseData);
```

In comparison, the code of the method generated according to the process depicted in FIG. 2, which corresponds to the MEASURE:VOLTAGE:DC? Query, is a class hierarchy that mimics the hierarchy of SCPI Commands. The simplified code that may be written by the user in C# in order to read the DC voltage is as follows:

```
// Creates a connection to the DMM object
DMM myDMM = new DMM("130.27.64.166");
// Reads the DC voltage
Double DCVoltage = myDMM.Measure.Voltage.DC;
```

Accordingly, fewer lines of code are required. In addition, the user is able to save additional time since IDT features, such as IntelliSense® in Visual Studio®, may be used and compile-time checking of correct data types is performed. Also, if the SCPI description file contains documentation, the documentation may be passed onto the user as API documentation, e.g., as discussed with reference to block s250 of FIG. 2, which can be browsed using an IDT, for example.

Figure 3:
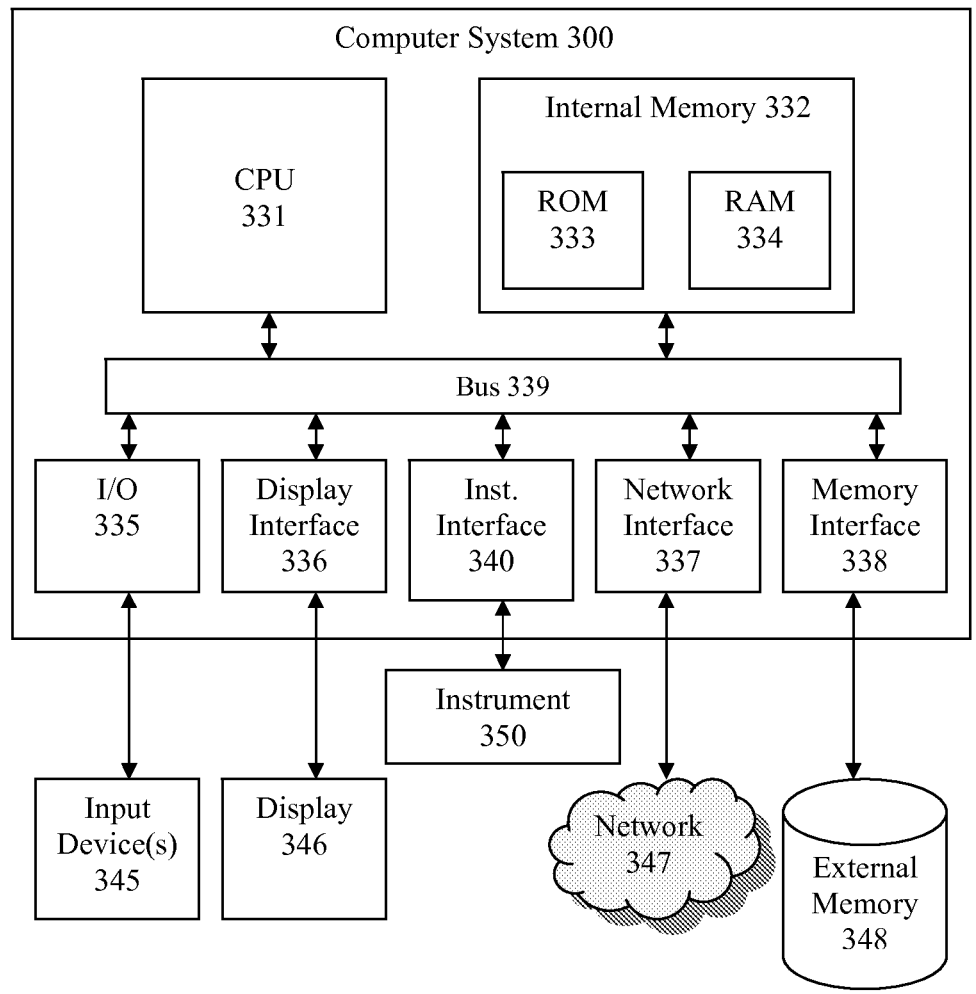
FIG. 3 is a block diagram showing a processing device, according to a representative embodiment.

FIG. 3 is a functional block diagram illustrating a computer system 300, for executing an algorithm to perform the programming language translation process, according to a representative embodiment. The computer system 300 may be any type of computer processing device, such as a PC, capable of executing the various steps of the programming language translation process.

In the depicted representative embodiment, the computer system 300 includes central processing unit (CPU) 331, internal memory 332, bus 339 and interfaces 335-340. The internal memory 332 includes at least nonvolatile read only memory (ROM) 333 and volatile random access memory (RAM) 334, although it is understood that internal memory 332 may be implemented as any number, type and combination of ROM and RAM, and may provide look-up tables and/or other relational functionality. In various embodiments, the internal memory 332 may include any number, type and combination of tangible computer readable storage media, such as a disk drive, compact disc (e.g., CD-R/CD/RW), electrically programmable read-only memory (EPROM), electrically erasable and programmable read only memory (EEPROM), DVD, universal serial bus (USB) drive, diskette, floppy disk, and the like. Further, the internal memory 332 may store program instructions and results of calculations or summaries performed by CPU 331.

The CPU 331 is configured to execute one or more software algorithms, including the programming language translation process of the embodiments described herein, e.g., in conjunction with the internal memory 332. In various embodiments, the CPU 331 may also execute software algorithms to control basic functionality of the computer system 300. The CPU 331 may include its own memory (e.g., nonvolatile memory) for storing executable software code that allows it to perform the various functions. Alternatively, the executable code may be stored in designated memory locations within internal memory 332. The CPU 331 executes an operating system, such as Windows® operating systems available from Microsoft Corporation, Linux operating systems, Unix operating systems (e.g., Solaris™ available from Sun Microsystems, Inc.), NetWare® operating systems available from Novell, Inc., and the like.

In an embodiment, a programmer and/or other computers may interact with the computer system 300 using input device(s) 345 through I/O interface 335. The input device(s) 345 may include any type of input device, for example, a keyboard, a track ball, a mouse, a touch pad or touch-sensitive display, and the like. Also, information may be displayed by the computer system 300 on display 346 through display interface 336, which may include any type of graphical user interface (GUI), for example.

The processing results of the CPU 331 may also be stored in the external memory 348 through memory interface 338 (instead of or in addition to the internal memory 332). The external memory 348 may include any type and combination of tangible, volatile and/or nonvolatile storage medium and corresponding interface, including such as a disk drive, compact disc (e.g., CD-R/CD/RW), EPROM, EEPROM, DVD, USB drive, diskette, floppy disk, and the like. For example, the program library of generated methods, corresponding to the machine-centric commands and queries, may be stored in the external memory 348, as discussed above.

The stored processing results are accessible by other computer systems. For example, the external memory 348 may be a compact disc that can be transferred to a computer system (not shown) of a user of the corresponding instrument, so that the user can access the stored processing results (e.g., program library) while programming the instrument via the user's computer system. Likewise, in an embodiment, the computer system 300 and/or the external memory 348 may be connected to network 347 through network interface 337. The user's computer system would then be able to access the processing results from the external memory via the network 347. The network 347 may be any network capable of transporting electronic data, such as the Internet, a local area network (LAN), a wireless LAN, and the like. The network interface 337 may include, for example, a transceiver (not shown), including a receiver and a transmitter, that communicates wirelessly over the data network through an antenna system (not shown), according to appropriate standard protocols. However, it is understood that the network interface 337 may include any type of interface (wired or wireless) with the communications network, including various types of digital modems, for example.

The computer system 300 may also include an instrument interface 340 for communicating with the instrument 350. In an embodiment, the computer system 300 is able to determine the instrument specific SCPI commands and queries, enabling provision of the description file of the SCPI commands and queries, by retrieving this information directly from the instrument.

The various "parts" shown in the computer system 300 may be physically implemented using a software-controlled microprocessor, hard-wired logic circuits, or a combination thereof. Also, while the parts are functionally segregated in the computer system 300 for explanation purposes, they may be combined variously in any physical implementation.

Figure 4:
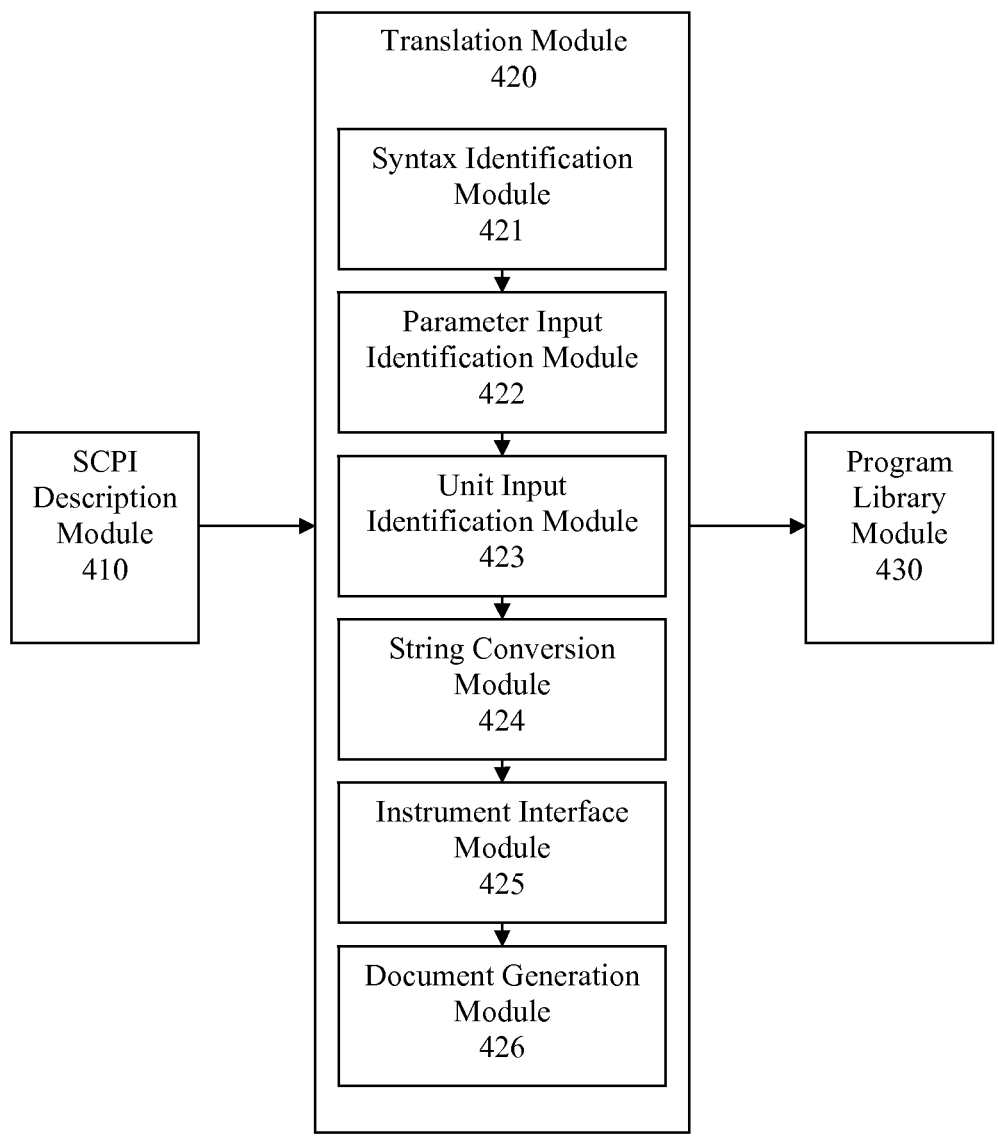
FIG. 4 is a block diagram showing processing modules, according to a representative embodiment.

FIG. 4 is a block diagram illustrating processing modules for the programming language translation process, according to a representative embodiment. In an embodiment, the processing modules of FIG. 4 may be implemented by the CPU 331 and the internal memory 332 of FIG. 3, for example.

The processing modules include SCPI description module 410, translation module 420 and program library module 430. The modules may be implemented as any combination of software, hard-wired logic circuits ware and/or firmware configured to perform the designated operations. Software modules, in particular, may include source code written in any of a variety of computing languages, such as C#, C++ or Java®, for example, and are stored on tangible computer readable storage media, such the internal memory 332.

The SCPI description module 410 receives a set of SCPI commands that have been identified with respect to a particular instrument to be controlled, such as a DMM, a voltmeter, a signal generator, or other test instrument, for example. In an embodiment, the SCPI commands include "commands" and "queries," which are commands that require a response from the instrument. The SCPI description module 410 may also produce, assist in producing, or receives, e.g., 345 through I/O interface 335, computer readable descriptions of the SCPI commands and queries corresponding to the identified commands and queries, as discussed above with reference to block s120 of FIG. 1, which descriptions may be provided as a computer readable description file. In an embodiment, the computer readable description file including the descriptions of the SCPI commands and queries are provided in an XML description file, for example.

The translation module 420 receives the description file of the SCPI commands and queries from the SCPI description module 410, and generates programming language methods or routines for translating the various SCPI commands and queries to be compatible with control programs written in the programming language. The translation module 420 includes syntax identification module 421, parameter input identification module 422, unit input identification module 423, string conversion module 424, instrument interface module 425 and document generation module 426 (optional).

More particularly, the syntax identification module 421 identifies a syntax of each SCPI command and query based on corresponding information in the description file provided by the SCPI description module 410. The parameter input identification module 422 then identifies at least one input for the parameters of each syntax, identified by the syntax identification module. The type of the input may be a native type in the programming language, as discussed above with reference to block s234 of FIG. 2. The unit input identification module 423 identifies at least one unit input of the syntax parameters that can take on multiple values, as discussed above with reference to block s238 of FIG. 2. The string conversion module 424 converts each parameter input into a string having an appropriate format for the parameter of the command or query. The string conversion module 424 may also convert each unit input into a string, as needed, e.g., when the value from an enumeration is provided as a unit.

The instrument interface module 425 provides an interface between the various methods, written in the programming language, and the instrument for communicating with the instrument using the appropriate SCPI commands and queries, as discussed above with reference to blocks s242-s248 of FIG. 2. For example, the instrument interface module 425 includes instructions in each of the methods for sending the respective strings to the instrument in response to the methods being selected, e.g., by a program executed by a computer system controlling the instrument. In an embodiment, the strings would be sent to the instrument using a logical address for the instrument. When a method is associated with a SCPI command, the interface module provides instructions only for sending the SCPI command to the instrument. When a method is associated with a SCPI query, the interface module 425 provides instructions for sending the SCPI command to the instrument and for receiving an associated response from the instrument. In an embodiment, the interface module 425 may include a "timeout", indicating a predetermined period of time the method awaits the response.

In an embodiment, documentation associated with respective methods generated, e.g., when documentation is available in the SCPI description file with respect to the associated commands and queries, may be generated manually, automatically or a combination of both, by translating the documentation from the descriptions of the SCPI Commands, e.g., in the XML description file, to programming language documentation format. When the documentation is generated automatically (or partially automatically), the translation module 420 may also include a document generation module 426. For both commands and queries, some programming languages include special documentation formats that can be used by programming tools, such as IDEs, to enable browsing and/or searching of the documentation, as discussed above with reference to block s250 of FIG. 2. The programming language methods, including corresponding documentation, are stored in the program library module 430, where they can be selectively called and executed by instrument control programs, written in the programming language, for controlling functionality of the instrument.

It is understood that the modules and corresponding functionalities shown in FIG. 4 are intended to depict one example of a representative embodiment. The identity and functionality of the modules may differ, without departing from the scope of the present teachings.

Figure 5:
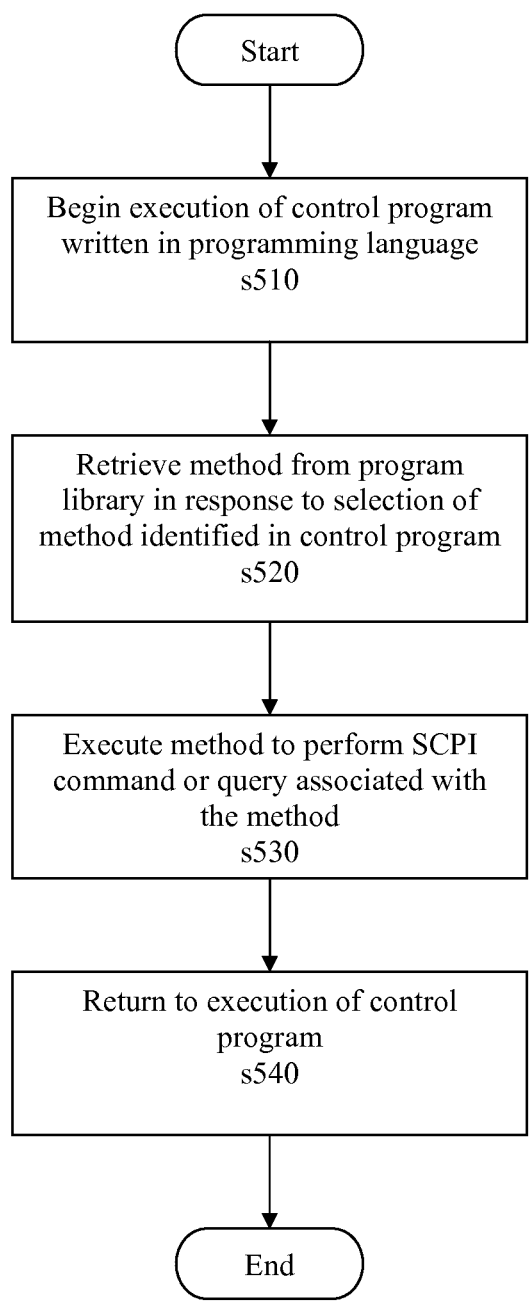
FIG. 5 is a flow diagram of a process for controlling an instrument, according to a representative embodiment.

FIG. 5 is a flow diagram of a process for controlling an instrument, according to a representative embodiment. For example, the process depicted in FIG. 5 may be executed by a user's computer system (or controller) in order to control one or more instruments using corresponding program libraries generated by the programming language translation process, discussed above. In various embodiments, the process of FIG. 5 may be executed by a computer system having substantially the same configuration depicted in FIG. 3, for example.

The controller executes an instrument control program written in the desired programming language, e.g., by the user, in order to control the instrument to perform one or more functions, such as measuring a voltage of a device under test (DUT) connected to the instrument, for example. The programming language of the instrument control program is the same as that of the generated methods, previously stored in the program library associated with the instrument. In the depicted example, the instrument is configured to be controlled using SCPI protocol commands and queries.

At block s510 of FIG. 5, the controller begins execution of the instrument control program, written in the programming languages, such as C#, C++, Java®, Visual Basic®, Matlab®, Python®, Perl®, Tcl, Ruby, PHP, JavaScript®, ML, Haskell, Lisp, Scheme, Erlang, Smalltalk, Objective-C®, Fortran, Cobal, Pascal or the like. At block s520, the instrument control program retrieves a previously generated and stored method, as described above, from the program library in response to the method being selected or called. The method is executed in step s530 in order to perform the SCPI command or query associated with that method. For example, to execute a SCPI query, the control program (or user) provides the inputs for the various parameters identified by the selected method, which converts the parameters into properly formatted SCPI strings. The SCPI strings are sent to the instrument and a response is returned, which is unpacked and output to the control program. Upon completion of the selected method, the control program continues execution at step s540.

In view of this disclosure it is noted that variant translation methods can be implemented in keeping with the present teachings. Further, the various components, materials, structures and parameters are included by way of illustration and example only and not in any limiting sense. In view of this disclosure, those skilled in the art can implement the present teachings in determining their own applications and needed components, materials, structures and equipment to implement these applications, while remaining within the scope of the appended claims.

The invention claimed is:

1. A computer readable medium storing a program, executable by a computer, for enabling translation of machine-centric commands in an instrument protocol to a programming language for controlling an instrument configured to use the machine-centric commands, the computer readable medium comprising:

an identifying code segment for identifying a plurality of instrument protocol commands executable by the instrument;

a description code segment for retrieving computer readable descriptions of the plurality of instrument protocol commands from a description file;

a generating code segment for generating a plurality of methods corresponding to the plurality of instrument protocol commands based on the computer readable descriptions for translating the instrument protocol commands to the programming language, each method comprising programming language source code or compiled machine code for executing the corresponding instrument protocol command; and a storing code segment for storing the plurality of methods in a program library associated with the instrument, the program library enabling selection of at least one method by a programming language program that controls the instrument, in order to execute the instrument protocol command corresponding to the selected method.

2. The computer readable medium of claim 1, wherein the instrument protocol comprises Standard Commands for Programmable Instrumentation (SCPI) protocol.

3. The computer readable medium of claim 2, wherein the programming language comprises one of C++, C#, Visual Basic®, Matlab®, Java®, Python®, Perl®, Tcl, Ruby, PHP, JavaScript®, ML, Haskell, Lisp, Scheme, Erlang, Smalltalk, Objective-C®, Fortran, Cobal, or Pascal.

4. The computer readable medium of claim 1, wherein the description file comprises an XML description file.

5. The computer readable medium of claim 1, wherein the generating code segment comprises:

a syntax identifying code segment for identifying a syntax of each instrument protocol based on the description file;

an input identifying code segment for identifying at least one of a parameter input and a unit input for each identified syntax; and a string converting code for converting the at least one of the parameter input and the unit input into a string formatted in accordance with the instrument command protocol and executable by the instrument.

6. The computer readable medium of claim 5, wherein the generating code segment further comprises:

a response code segment for receiving a response from the instrument in response to the executable string.

7. The computer readable medium of claim 5, wherein documentation of each of the plurality of methods corresponding to the plurality of instrument protocol commands is generated based on translating the description file, the storing code segment further storing the generated documentation in association with the corresponding methods.

8. The computer readable medium of claim 1, wherein the programming language is a high-level, human-centric programming language.

9. A computer program product, comprising modules embodied in a computer readable medium, for enabling translation of Standard Commands for Programmable Instrumentation (SCPI) protocol commands and queries to a programming language for controlling an instrument configured to use SCPI commands and queries, the computer program product comprising:

a translation module configured to receive computer readable descriptions of SCPI commands and queries identified with respect to the instrument, and to generate programming language routines for translating the SCPI commands and queries to be compatible with the programming language; and a program library module configured to store the programming language routines, wherein the programming language routines are accessible to a control program written in the programming language for controlling at least one operation of the instrument.

10. The computer program product of claim 9, wherein the programming language comprises one of C++, C#, Visual Basic®, Matlab®, Java®, Python®, Perl®, Tcl, Ruby, PHP, JavaScript®, ML, Haskell, Lisp, Scheme, Erlang, Smalltalk, Objective-C®, Fortran, Cobal, or Pascal.

11. The computer program product of claim 9, wherein the computer readable descriptions of the SCPI commands and queries are included in an XML description file.

12. The computer program product of claim 9, wherein the translation module comprises:
- a syntax identification module configured to identify a syntax of each SCPI command and query based on corresponding information in the description file provided by the description module;
- a parameter input identification module configured to identify at least one input for each parameter of each syntax identified by the syntax identification module; and
- a string conversion module configured to convert each parameter input into a string having an appropriate format for the parameter of the command or query.

13. The computer program product of claim 12, wherein the translation module further comprises:
- an instrument interface module configured to provide interfaces between the programming language routines and the instrument for communicating with the instrument using the strings corresponding to the respective SCPI commands and queries.

14. The computer program product of claim 13, wherein the program library module stores documentation associated with respective programming language routines in association with respective programming language routines.

15. A system for controlling an instrument using Standard Commands for Programmable Instrumentation (SCPI) protocol commands and queries, the system comprising:
- a program library configured to store a plurality of previously generated methods for translating the SCPI protocol commands to a high-level human-centric programming language, each method being associated with execution of one SCPI protocol command or query associated with the instrument and written in the high-level human-centric programming language; and
- a processor configured to control operation of the instrument based on a control program written in the high-level programming language, the control program retrieving one of the previously generated methods from the program library and executing the retrieved method to perform one of a SCPI command or query associated with the retrieved method.

16. The system of claim 15, wherein the program library is further configured to store descriptions associated with the previously generated methods.

17. The system of claim 16, wherein the descriptions comprise a translation of the description of the SCPI command or query associated with the retrieved method.

18. The computer readable medium of claim 17, wherein the description of the SCPI command or query is included in an XML description file.

19. The system of claim 15, wherein the one of the previously generated methods comprises:
- syntax identifying code for identifying a syntax of the SCPI command or query;
- input identifying code for identifying a parameter input for the SCPI command or query; and
- string converting code for converting the parameter input into a string formatted in accordance with the SCPI command or query.

20. The system of claim 19, wherein the one of the previously generated methods further comprises:
- response code for receiving a response from the instrument in response to the executable string.

\* \* \* \* \*

UNITED STATES PATENT AND TRADEMARK OFFICE
CERTIFICATE OF CORRECTION

| | |
|---|---|
| PATENT NO. | : 8,572,589 B2 |
| APPLICATION NO. | : 12/495300 |
| DATED | : October 29, 2013 |
| INVENTOR(S) | : James Adam Cataldo et al. |

It is certified that error appears in the above-identified patent and that said Letters Patent is hereby corrected as shown below:

In the Claims

In column 14, line 19, In Claim 18, delete "computer readable medium" and insert -- system --, therefor.

Signed and Sealed this
Twenty-fifth Day of February, 2014

Michelle K. Lee
*Deputy Director of the United States Patent and Trademark Office*